United States Patent [19]

Mizobe et al.

[11] Patent Number: 5,164,431

[45] Date of Patent: Nov. 17, 1992

[54] PROCESS FOR PRODUCING MOLDED ARTICLES

[75] Inventors: Akio Mizobe; Kenji Saimen; Sotaro Itadani, all of Okayama; Ken Yuki, Kurashiki, all of Japan

[73] Assignee: Kuraray Co., Ltd., Kurashiki, Japan

[21] Appl. No.: 623,679

[22] Filed: Dec. 6, 1990

[51] Int. Cl.$^5$ .................. C08K 3/00; C04B 7/100
[52] U.S. Cl. .......................... 524/4; 524/5; 524/650
[58] Field of Search .................. 524/4, 5, 650

[56] References Cited

U.S. PATENT DOCUMENTS

| | | | |
|---|---|---|---|
| 3,042,681 | 7/1962 | Sefton | 524/4 |
| 4,094,694 | 6/1978 | Long | 524/5 |
| 4,377,415 | 3/1983 | Johnson et al. | 524/4 |
| 4,778,529 | 10/1988 | Barker et al. | 524/650 |
| 4,781,994 | 11/1988 | Enori et al. | 524/4 |

Primary Examiner—Paul R. Michl
Assistant Examiner—LaVonda DeWitt
Attorney, Agent, or Firm—Oblon, Spivak, McClelland, Maier & Neustadt

[57] ABSTRACT

Provided is a process for producing molded articles having excellent flexural strength, flexibility and dimensional stability, which comprises autoclave-curing at not lower than 100° C. an aqueous composition comprising a hydraulic material (A) and a polyvinyl alcohol (B) powder, said polyvinyl alcohol (B) powder being contained in an amount of 0.1 to 20% by weight based on the weight of said hydraulic material (A).

Also provided are molded articles comprising a hydraulic material (A) and a polyvinyl alcohol (B), said polyvinyl alcohol (B) being contained in an amount of 0.1 to 20% by weight based on the weight of said hydraulic material (A), said molded article having a structure comprising said polyvinyl alcohol (B) having once dissolved and then solidified being dispersed therein in the form of islands. These molded articles have excellent flexural strength, flexibility and dimensional stability.

8 Claims, No Drawings

PROCESS FOR PRODUCING MOLDED ARTICLES

BACKGROUND OF THE INVENTION

1. Field of the Invention

The present invention relates to a process for producing molded articles comprising hydraulic material and used as materials for construction, civil engineering, shipbuilding and the like, and also to molded articles comprising hydraulic materials.

2. Description of the Prior Art

There is known addition of polyvinyl alcohol (hereinafter referred to as PVA) for improving mechanical properties and moldability of molded articles comprising hydraulic materials such as cement, gypsum and granulated slug. For example, Japanese Patent Application Laid-open No. 45934/1974 discloses incorporation of PVA into pulp cement for the purpose of improving the flexural strength and impact strength of pulp cement boards, and Japanese Patent Application Laid-open Nos. 77655/1986 and 209950/1986 disclose the use of PVA to increase the flexural strength, impact strength and dimensional stability and to prevent generation of cracks of slug boards or gypsum boards.

Japanese Patent Application Laid-open Nos. 50017/1974 and 239377/1985 disclose the use of PVA for cement molded articles, and Japanese Patent Application Laid-open No. 137719/1976 disclose the use of PVA for light-weight concrete, each for the purpose of improving the mechanical properties and surface appearance and preventing generation of cracks.

The reason why PVA is used for these purposes is that PVA is stable even in systems with high pH, does not hinder hydration reaction of hydraulic materials, is water-soluble and dispersible into matrices of for example cement, and improves the properties of the hydraulic compositions by bonding particles of the hydraulic materials with each other or forming tough film of PVA in the molded articles.

Japanese Patent Application Laid-open No. 13628/1972 disclosed that addition of boron compounds to aqueous slurry compositions comprising cement and PVA powder can reduce the amount of PVA used.

Japanese Patent Application Laid-open No. 184754/1984 discloses that, in aqueous slurry compositions comprising cement and PVA powder, replacement of the PVA powder of silyl group-modified PVA improves the strength of the molded articles.

In recent years, molded articles from hydraulic materials and having the same specification have been commercially produced by autoclave-curing on a large scale. Requirements for the mass-production of molded articles from hydraulic materials are: firstly, that the product articles have high mechanical strength and dimensional stability and do not generate cracks and, secondly, high productivity. There has not been established any process for producing molded articles from hydraulic materials or any molded article from hydraulic materials that satisfies all of the above requirements.

SUMMARY OF THE INVENTION

Accordingly, an object of the present invention is to provide a process for efficiently producing molded articles having high flexural strength, deflection in bending (flexibility) and dimensional stability, by autoclave-curing aqueous compositions comprising hydraulic materials.

Another object of the present invention is to provide a molded article comprising a hydraulic material and having high flexural strength, deflection in bending (flexibility) and dimensional stability.

As an intensive study, the present inventors have found that the above problem can be solved by a process for producing molded articles comprising hydraulic materials, which comprises autoclave-curing at not lower than 100° C. an aqueous composition comprising a hydraulic material (A) and a polyvinyl alcohol (B) powder, said polyvinyl alcohol (B) powder being contained in an amount of 0.1 to 20% by weight based on the weight of said hydraulic material (A).

The present invention also provides a molded article comprising a hydraulic material (A) and a PVA (B), said PVA (B) being contained in an amount of 0.1 to 20% by weight based on the weight of said hydraulic material (A), said molded article having a structure comprising said PVA (B) having once dissolved and then solidified being dispersed therein in the form of islands.

DETAILED DESCRIPTION OF PREFERRED EMBODIMENTS

Any hydraulic material can be used as the hydraulic material (A) in the process of the present invention insofar as it solidifies by reaction with water, and its examples are inorganic substances such as Portland cement of various types, gypsum, granulated slag, rock fiber, magnesium carbonate and calcium silicate.

The PVA (B) powder used in the present invention includes unmodified conventional PVA, silyl group-modified PVA and other various modified PVA's. The PVA (B) can be of any degree of polymerization, and preferably has one of at least 500, more preferably at least 1,500. With a degree of polymerization of at least 500, the PVA (B) provides, upon autoclave-curing at not lower than 100° C., molded articles having markedly improved properties such as mechanical strength, perhaps because its powder has high bonding strength and the strength of PVA film is high. The PVA (B) can be of any degree of hydrolysis, and preferably has one of at least 80 mol %, more preferably at least 90 mol %, most preferably at least 95 mol %. In the present invention, where no substance causing the viscosity of aqueous PVA (B) solution to increase is used, the degree of hydrolysis of the PVA (B) is preferably, in particular, at least 98 mol %. With a degree of hydrolysis of at least 80 mol %, the PVA (B) in its powder form uniformly disperses into aqueous compositions, whereby autoclave-curing of an aqueous composition gives molded articles with markedly high flexural strength due to high bonding strength of the PVA (B) powder and high strength of PVA (B) film.

The PVA (B) powder may of any average particle size, and preferably has one of 16-mesh pass, more preferably 42-mesh pass, the smaller being the better.

The aqueous composition used in the present invention comprises a hydraulic material (A) and PVA (B) powder, the PVA (B) powder being incorporated in an amount of 0.1 to 20% by weight based on the weight of the hydraulic material (A), more preferably 0.5 to 5% by weight on the same basis. If the amount of PVA (B) incorporated is less than 0.1% by weight, the PVA (B) will not produce effect of reinforcing molded articles. On the other hand if the amount exceeds 20% by weight, the water resistance and flame retardancy of the obtained molded articles will decrease.

For the purpose of developing still higher strength of molded articles, it is preferred to add a reinforcing fiber (C) to the aqueous composition used. The reinforcing fiber (C) is added in an amount of 0.1 to 10% by weight based on the weight of total solid, more preferably 0.5 to 5% by weight on the same basis. Addition of at least 0.1% of a reinforcing fiber (C) markedly reinforces the obtained molded article and increases the effect of connecting green sheets. An addition exceeding 10% by weight, however, is associated with a problem in dispersibility and sometimes impairs the reinforcing effect. Conventional reinforcing materials used for cement and the like can be used for this purpose, but preferably used are those having given actual results in the reinforcement of molded articles comprising hydraulic materials (A). Examples of these preferred materials are fibers of polyvinyl alcohol, acrylics, olefins, carbon and aramids, and pulps such as synthetic pulp, wood pulp and highly crushed wood pulp, all of which are included in the term "fiber" in the present invention. These fibers may be used singly or in combination.

It is also preferred, for the purpose of still enhancing the effect of PVA (B), to add a substance (D) increasing the viscosity of aqueous PVA (B) solution.

The substance (D) increasing the viscosity of aqueous PVA (B) solution herein means a substance which, when added in an amount of 5% by weight based on the weight of PVA (B) on dry base, causes the viscosity of the aqueous PVA (B) solution to become at least double, preferably at least 4 times that of blank, and more preferably causes the aqueous PVA (B) solution to gel. Among such substances (D), particularly preferred are those crosslinking agents of PVA (B) that form, while crosslinking PVA (B), a water-insoluble crosslinked matter at lower than 100° C., the water-insoluble crosslinked matter dissolving in water by autoclave-curing at not lower than 100° C., and increase the viscosity of the aqueous PVA (B) solution obtained by this autoclave-curing.

Examples of the substance (D) increasing the viscosity of aqueous PVA (B) solution are boric acid, borax, calcium borate, magnesium borate, aluminates, zirconium salts, 3-valent chrome forming when an alkali metal chromate or dichromate is reduced, 4-valent titanium forming when titanium trichloride is oxidized, vanadates and copper ion. Dyes such as Congo red and organic substances such as gallic acid can also be used. Preferred among these substances (D) increasing the viscosity of aqueous PVA (B) solution are boric acid and derivatives thereof, among which particularly preferred is calcium borate. Where the hydraulic material (A) used generates calcium ion, it is most preferred to use one of those crosslinking agents of PVA (B) that form with PVA (B) a water-insoluble crosslinked matter at lower than 100° C., said water-insoluble crosslinked matter dissolving in water by autoclave-curing at not lower than 100° C., and increase the viscosity of the aqueous PVA (B) solution obtained by this autoclave-curing, such as boric acid, borax or calcium borate. Thus, in the present invention, the substance (D) increasing the viscosity of aqueous PVA (B) solution has functions of suppressing the dissolution of PVA (B) powder during processes before autoclave-curing and permitting the PVA (B) powder to dissolve in water upon autoclave-curing at not lower than 100° C.

In the present invention, the PVA (B) is used in powder form, which is hardly soluble in water when present in aqueous compositions. The marked reinforcement effect of the PVA (B) is therefore considered to be due to that the undissolved PVA (B) powder does not, even when an aqueous composition is used in the form of aqueous slurry, increase the viscosity of the aqueous slurry, whereby almost all PVA (B) powder remains in the aqueous composition when it has been prepared by wet lamination process, and, upon autoclave-curing at not lower than 100° C. (under wet heat) dissolves to develop reinforcement effect. In particular, where a substance (D), particularly one that crosslinks PVA (B) is used in combination, the reinforcement effect is still more enhanced, perhaps because that the PVA (B) dissolved during autoclave-curing will not migrate to a large extent into the molded article but stay at original positions and develop high bonding force.

The effect of addition of a substance (D) increasing the viscosity of aqueous PVA (B) solution increases with the amount of its addition. The addition is at least 1% by weight based on the weight of PVA (B), preferably 1 to 50% by weight, more preferably 5 to 20% on the same basis.

The process for producing molded articles of the present invention can be any one of wet lamination process, flow-on process, extrusion process, dry process and the like.

The aqueous composition used in the present invention may incorporate any additives that are usually added to conventional aqueous compositions comprising hydraulic material (A), e.g. inorganic fillers such as silica powder and fly ash, and other fillers such as sand, ballast and light-weight aggregate. The aqueous composition may also contain bubbles.

The aqueous composition used in the present invention can be of optional solid concentration, depending on the process employed, and for example solid concentrations of 2 to 90% by weight are appropriately used.

The production process of the present invention comprises autoclave-curing of the above aqueous composition at not lower than 100° C. The temperature must be 100° C. or above, and is preferably 120° to 180° C., more preferably 140° to 170° C. There is no particular limitation to the time of autoclave-curing, but it is preferably 1 to 30 hours, more preferably 8 to 20 hours. With an autoclave-curing time of not more than 1 hour, the hydraulic reaction may remain immature; while PVA (B) may deteriorate if the time exceeds 24 hours.

The molded articles obtained by the process of the present invention are excellent in, particularly, mechanical strength and dimensional stability.

These are no particular restrictions with respect to the conditions of any pre-curing before autoclave-curing (hereinafter referred to as "primary curing") if it is ever conducted. Thus, autoclave-curing may directly be conducted without any primary curing, or the primary curing is conducted at lower than 100° C. It is preferred to conduct primary curing at not lower than 10° C. and lower than 100° C., more preferably at not lower than 70° C. and lower than 100° C.

There are no particular restrictions either with respect to the vapor pressure in the gas phase when primary curing is conducted, but higher vapor pressure is preferred, saturated vapor pressure being most preferred. Steaming or like processes is employed for controlling the vapor pressure in the gas phase. The primary curing can be conducted for an optional time period, preferably until the composition hardens to an extent that permits ready removal of the mold used. Examples of the primary curing are from 1 day to about 1 week for room temperature curing and 5 to 48 hours for curing with heating at lower than 100° C.

Molded articles with markedly high strength can, surprisingly, be obtained when a primary curing is conducted at a specific temperature selected among the above-mentioned conditions, i.e. not lower than 70° C. and lower than 100° C., and then autoclave-curing is, preferably in combination with the use of a substance (D) increasing the viscosity of aqueous PVA (B) solution, conducted under a wet heat condition of not lower than 100° C. (that assures dissolution of PVA (B) powder).

The process for producing molded articles of the present invention can readily provide by autoclave-curing molded articles comprising hydraulic materials and having excellent mechanical properties and dimensional stability. Accordingly, the process is of excellent industrial value.

The molded article of the present invention is not described.

The hydraulic material (A) and PVA (B) are the same as described hereinbefore for the aqueous composition used in the process of the present invention. It is preferred that the molded article of the present invention contain the reinforcing fiber (C) and/or the substance (D) increasing the viscosity of aqueous PVA (B) solution, described hereinbefore, which will provide the molded articles with higher strength. The reinforcing fiber (C) is contained in an amount of preferably 0.1 to 10% by weight based on the weight of total solid. The substance (D) is contained in an amount of preferably at least 1% by weight based on the weight of PVA (B), and more preferably 1 to 50% by weight, most preferably 5 to 20% by weight on the same basis.

The molded article of the present invention is characterized by its structure comprising the PVA (B) that has once dissolved and solidified being dispersed in the molded article in the form of islands, and it is preferred that the islands of the PVA (B) be dispersed as uniformly as possible. The islands of PVA (B) can assume any shape, and its examples are spherical, deformed spherical, spherical or deformed spherical with hollow part therein and spherical or deformed spherical in which the concentration of PVA (B) is highest in the center and decreases with the distance from the center. The islands can be of any size, but the average maximum diameter is preferably 0.05 to 3 mm, more preferably 0.1 to 1 mm. Only insufficient strength is obtained with the molded articles having no structure comprising PVA (B) dispersed therein in the form of discontinuous islands, e.g. those with a structure comprising PVA (B) extending continuously, or comprising PVA (B) that remains solid without having dissolved or PVA (B) that has insufficiently dissolved.

Where in the present invention the hydraulic material (A) comprises cement, the molded articles contain tobermorite gel, which can be observed with a scanning electron microscope. Those molded articles that contain tobermorite gel have excellent strength and dimensional stability.

The molded articles of the present invention can be produced by optional process, for example by the aforedescribed process for producing molded articles of the present invention.

The molded articles of the present invention are used as boards for roofing, external walls, inside walls and the like, as blocks for road construction and bank protection, and as like materials.

Other features of the invention will become apparent in the course of the following descriptions of exemplary embodiments which are given for illustration of the invention and are not intended to be limiting thereof.

In the Examples and Comparative Examples that follow, "%" and "parts" mean "% by weight" and "parts by weight", respectively, unless otherwise indicated.

EXAMPLES

Examples 1 through 14 and Comparative Examples 1 through 10

(1) Preparation of Samples (Wet Process)

There were used ordinary Portland cement as hydraulic material, powder of 60-mesh pass of a PVA having a degree of polymerization of 1,700 and degree of hydrolysis of 98 mol % and other additives shown in Table 1. Aqueous compositions were prepared using these components in the incorporation ratios shown in Table 1 (Examples 1 through 14) and Table 2 (Comparative Examples 1 through 10). The aqueous compositions were formed into aqueous slurries having a solid concentration of 40%, which were then flown into a mold and squeezed by pressing therein to a solid concentration of 70 to 80% (wet base) to be formed into boards having a thickness of 0.8 cm. This method corresponds to the usual long-net one-layer wet process for producing conventional cement boards.

The boards thus obtained were cured under the conditions shown in Table 1 (Examples 1 through 14) and Table 2 (Comparative Examples 1 through 10).

(2) Evaluations

Bulk specific gravity

In accordance with JIS A 5413, specimen pieces were dried in a hot air drying oven at 105°±5° C. for 24 hours, and then measured for the weight and volume, the calculate the bulk specific density.

Flexural strength and deflection in bending

Flexural strength was determined in accordance with JIS A 1408 "Method of Bending Test for Boards of Buildings" with a span length of 5 cm, where the maximum deflection at the center was taken as the deflection in bending. Larger deflection in bending indicates higher flexibility and higher usefulness as a molded article of the specimen tested.

Length change ratio (dimensional stability)

JIS A 5416 was applied. A unit length each of specimens dried at 60° C. for 1 day was taken as the base length. The specimens were then immersed in water for 1 day to absorb water and tested for the length, to give the length change ratio.

(3) Results

The evaluation results are shown in Table 1 (Examples 1 through 14) and Table 2 (Comparative Examples 1 through 10).

(4) Microscopic Observation

Observation with a scanning electron microscope of the cross-sections of the molded articles obtained in Examples 1 through 14 revealed that PVA's that had once dissolved and then solidified in the molded articles dispersed uniformly in the form of discontinuous islands having a shape of deformed spheres.

The molded articles were also confirmed to contain tobermorite gel.

The dispersion state of the PVA in each of the 5 molded articles was, after coloration of the PVA by iodine, also confirmed by observation with a stereomicroscope.

Observation with a scanning electron microscope of the cross-sections of the molded articles obtained in Comparative Examples 1 through 4 revealed that PVA's had dissolved only incompletely, while they dispersed in the form of islands though.

Comparative Examples 11 through 14

(1) Preparation of Samples (Wet Process)

Examples 1, 2, 4 and 5 were repeated except that aqueous compositions were prepared using aqueous solution of the PVA instead of the PVA powder. The use of aqueous PVA solution increased the viscosity of the water compositions, and hence there occurred some troubles such as low filterability in the process.

(2) Evaluations

Same as for Examples 1 through 14.

(3) Results

The evaluation results are shown in Table 2.

(4) Microscopic Observation

Observation of the cross-section of the molded articles obtained in Comparative Examples 11 through 14 with a scanning electron microscope revealed that the PVA's did not disperse in the form of islands in the molded articles.

TABLE 1

| | Aqueous composition (parts) | | | | | Curing conditions | | Properties of molded article | | | | |
|---|---|---|---|---|---|---|---|---|---|---|---|---|
| | Hydraulic material (A) (Portland cement) | PVA (B) powder | Reinforcing fiber (B) (crushed pulp) | Viscosity-increasing substance (D) | Particulate perlite | Primary curing | Autoclave curing | Bulk specific gravity | Flexural strength (kg/cm$^2$) | Deflection in bending (cm) | Length change ratio (%) | Average of maximum length of PVA islands (mm) |
| Ex. 1 | 77.5 | 2.5 | 5 | 0 | 15 | no | 140° C., 6 hours | 1.00 | 90 | 0.042 | 0.14 | 0.25 |
| Ex. 2 | 77.25 | " | " | boric acid 0.25 | " | " | 140° C., 6 hours | 0.99 | 103 | 0.045 | 0.14 | 0.17 |
| Ex. 3 | " | " | " | borax 0.25 | " | " | 140° C., 6 hours | 0.98 | 104 | 0.044 | 0.14 | 0.17 |
| Ex. 4 | 77.5 | " | " | 0 | " | 85° C., 16 hours[1] | 140° C., 6 hours | 1.00 | 100 | 0.047 | 0.13 | 0.27 |
| Ex. 5 | 77.25 | " | " | boric acid 0.25 | " | 85° C., 16 hours[1] | 140° C., 6 hours | 1.01 | 122 | 0.064 | 0.13 | 0.27 |
| Ex. 6 | " | " | " | borax 0.25 | " | 85° C., 16 hours[1] | 140° C., 6 hours | 1.02 | 121 | 0.065 | 0.13 | 0.20 |
| Ex. 7 | 77.5 | " | " | 0 | " | no | 160° C., 6 hours | 0.99 | 95 | 0.038 | 0.12 | 0.26 |
| Ex. 8 | 77.25 | " | " | boric acid 0.25 | " | " | 160° C., 6 hours | 0.98 | 104 | 0.040 | 0.12 | 0.19 |
| Ex. 9 | " | " | " | borax 0.25 | " | " | 160° C., 6 hours | 0.98 | 103 | 0.039 | 0.11 | 0.19 |
| Ex. 10 | 77.5 | " | " | 0 | " | 85° C., 16 hours[1] | 160° C., 6 hours | 0.99 | 101 | 0.044 | 0.10 | 0.28 |
| Ex. 11 | 77.25 | " | " | boric acid 0.25 | " | 85° C., 16 hours[1] | 160° C., 6 hours | 1.00 | 113 | 0.063 | 0.10 | 0.19 |
| Ex. 12 | " | " | " | borax 0.25 | " | 85° C., 16 hours[1] | 160° C., 6 hours | 1.01 | 112 | 0.063 | 0.10 | 0.20 |
| Ex. 13 | 68.7 | 8 | 9 | boric acid 0.30 | 14 | 85° C., 16 hours[1] | 140° C., 8 hours | 0.96 | 87 | 0.038 | 0.16 | 0.18 |
| Ex. 14 | 80.6 | 1 | 6 | borax 0.40 | 12 | 85° C., 16 hours[1] | 160° C., 7 hours | 1.03 | 99 | 0.039 | 0.15 | 0.17 |

[1]The gas phase was controlled at saturated vapor pressure by steaming.

TABLE 2

| | Aqueous composition (parts) | | | | | Curing conditions | | Properties of molded article | | | | |
|---|---|---|---|---|---|---|---|---|---|---|---|---|
| | Hydraulic material (A) (Portland cement) | PVA (B) powder | Reinforcing fiber (B) (crushed pulp) | Viscosity-increasing substance (D) | Particulate perlite | Primary curing | Autoclave curing | Bulk specific gravity | Flexural strength (kg/cm$^2$) | Deflection in bending (cm) | Length change ratio (%) | Average of maximum length of PVA islands (mm) |
| Comp. Ex. 1 | 77.5 | 2.5 | 5 | 0 | 15 | 20° C., for 28 days | no | 1.04 | 82 | 0.027 | 0.20 | 0.27 |
| Comp. Ex. 2 | 77.25 | " | " | boric acid 0.25 | " | 20° C., for 28 days | " | 1.03 | 85 | 0.030 | 0.19 | 0.24 |
| Comp. Ex. 3 | 77.5 | " | " | 0 | " | 85° C., 16 hours[1] | " | 1.03 | 75 | 0.028 | 0.19 | 0.27 |
| Comp. Ex. 4 | 77.25 | " | " | boric acid 0.25 | " | 85° C., 16 hours[1] | " | 1.02 | 80 | 0.031 | 0.18 | 0.19 |
| Comp. | 55 | 25 | " | 0 | " | 85° C., | 140° C., | 0.94 | 78 | 0.034 | 0.30 | 0.27 |

TABLE 2-continued

| | Aqueous composition (parts) | | | | | Curing conditions | | Properties of molded article | | | | |
|---|---|---|---|---|---|---|---|---|---|---|---|---|
| | Hydraulic material (A) (Portland cement) | PVA (B) powder | Reinforcing fiber (B) (crushed pulp) | Viscosity-increasing substance (D) | Particulate perlite | Primary curing | Autoclave curing | Bulk specific gravity | Flexural strength (kg/cm$^2$) | Deflection in bending (cm) | Length change ratio (%) | Average of maximum length of PVA islands (mm) |
| Ex. 5 | | | | | | 16 hours[1] | 6 hours | | | | | |
| Comp. Ex. 6 | 52.8 | " | " | boric acid 2.2 | " | 85° C., 16 hours[1] | 140° C., 6 hours | 0.95 | 83 | 0.036 | 0.29 | 0.17 |
| Comp. Ex. 7 | 54.99 | 0.08 | " | boric acid 0.01 | " | 85° C., 16 hours[1] | 140° C., 6 hours | 1.02 | 80 | 0.037 | 0.28 | 0.18 |
| Comp. Ex. 8 | 55 | 25 | " | 0 | " | 85° C., 16 hours[1] | 160° C., 6 hours | 0.93 | 62 | 0.033 | 0.20 | 0.28 |
| Comp. Ex. 9 | 52.8 | " | " | boric acid 2.2 | " | 85° C., 16 hours[1] | 160° C., 6 hours | 0.94 | 71 | 0.033 | 0.28 | 0.17 |
| Comp. Ex. 10 | 54.99 | 0.08 | " | boric acid 0.01 | " | 85° C., 16 hours[1] | 160° C., 6 hours | 1.01 | 75 | 0.033 | 0.25 | 0.18 |
| Comp. Ex. 11 | 77.5 | aqueous PVA solution 2.5 | " | 0 | " | no | 140° C., 8 hours | 1.00 | 72 | 0.033 | 0.21 | —[2] |
| Comp. Ex. 12 | 77.25 | aqueous PVA solution 2.5 | " | boric acid 0.25 | " | " | 140° C., 8 hours | 0.98 | 73 | 0.034 | 0.22 | —[2] |
| Comp. Ex. 13 | 77.5 | aqueous PVA solution 2.5 | " | 0 | " | 85° C., 16 hours[1] | 140° C., 8 hours | 1.03 | 74 | 0.034 | 0.20 | —[2] |
| Comp. Ex. 14 | 77.25 | aqueous PVA solution 2.5 | " | boric acid 0.25 | " | 85° C., 16 hours[1] | 140° C., 8 hours | 1.01 | 76 | 0.035 | 0.21 | —[2] |

[1] The gas phase was controlled at saturated vapor pressure by steaming.
[2] No dispersed-island structure was found.

Examples 15 and 16 and Comparative Examples 15 through 20

(1) Preparation of Samples (Dry Process)

Aqueous compositions were prepared using the same PVA powder as used in Examples 1 through 14, boric acid, ordinary Portland cement and Toyoura standard sand in compositions as shown in Table 3 and in a water/cement ratio of 40%. The aqueous compositions thus prepared were each flown into a mold having a size of 25 cm×25 cm×0.8 cm and cured under the conditions shown in Table 3 to give a board.

(2) Evaluations

Same as for Examples 1 through 14.

(3) Results

The evaluation results are shown in Table 3.

(4) Microscopic Observation

Observation of the cross-section of the molded articles obtained in Examples 15 and 16 with a scanning electron microscope revealed that PVA's that had once dissolved and then solidified in the molded articles dispersed uniformly in the form of discontinuous islands having a shape of deformed spheres.

The molded articles were also confirmed to contain tobermorite gel.

The dispersion state of the PVA in each of the molded articles was, after coloration of the PVA by iodine, also confirmed by observation with a stereomicroscope.

Observation with a scanning electron microscope of the cross-sections of the molded articles obtained in Comparative Examples 15, 17, 19 and 20 revealed that PVA's had dissolved only incompletely, while they dispersed in the form of islands though.

Comparative Examples 21 and 22

(1) Preparation of Samples (Dry Process)

Aqueous compositions were prepared following the same procedure as that in Examples 15 and 16 except for using aqueous solutions of the PVA instead of the PVA powder.

(2) Evaluations

Same as for Examples 15 and 16.

(3) Results

The evaluation results are shown in Table 3.

(4) Microscopic Observation

Observation of the cross-section of the molded articles obtained in Comparative Examples 21 and 22 with a scanning electron microscope revealed that the PVA's did not disperse in the form of islands in the molded articles.

Obviously, numerous modifications and variations of the present invention are possible in light of the above teachings. It is therefore to be understood that within the scope of the appended claims, the invention may be practiced otherwise than as specifically described herein.

TABLE 3

| | Aqueous composition (parts) | | | | Curing conditions | | Properties of molded article | | | |
|---|---|---|---|---|---|---|---|---|---|---|
| | Hydraulic material (A) (Portland cement) | PVA (B) powder | Viscosity-increasing substance (D) | Toyoura standard sand | Primary curing | Auto-clave curing | Bulk specific gravity | Flexural strength (kg/cm$^3$) | Length change ratio (%) | Average of maximum length of PVA islands (mm) |
| Ex. 15 | 48.63 | 2.5 | boric acid 0.25 | 48.63 | 85° C., 16 hours[1] | 140° C., 6 hours | 2.0 | 96 | 0.05 | 0.19 |
| Ex. 16 | 48.75 | " | 0 | 48.75 | 85° C., 16 hours[1] | 140° C., 6 hours | 2.0 | 93 | 0.05 | 0.26 |
| Comp. Ex. 15 | 48.63 | " | boric acid 0.25 | 48.63 | 85° C., 16 hours[1] | no | 2.1 | 81 | 0.08 | 0.17 |
| Comp. Ex. 16 | 50 | 0 | 0 | 50 | 85° C., 16 hours[1] | " | 2.2 | 50 | 0.08 | — |
| Comp. Ex. 17 | 48.75 | 2.5 | 0 | 48.75 | 85° C., 16 hours[1] | " | 2.1 | 78 | 0.08 | 0.25 |
| Comp. Ex. 18 | 50 | 0 | 0 | 50 | 85° C., 16 hours[1] | 140° C., 6 hours | 2.1 | 65 | 0.06 | — |
| Comp. Ex. 19 | 48.75 | 2.5 | 0 | 48.75 | aged at 20° C., 65% RH for 2 weeks and then cured at 140° C. (dry heat) for 60 minutes. | | 2.2 | 78 | 0.08 | 0.25 |
| Comp. Ex. 20 | 48.63 | " | boric acid 0.25 | 48.63 | | | 2.2 | 79 | 0.08 | 0.19 |
| Comp. Ex. 21 | 48.63 | aqueous PVA solution 2.5 | boric acid 0.25 | 48.63 | 85° C., 16 hours[1] | 140° C., 6 hours | 2.0 | 60 | 0.08 | —[2] |
| Comp. Ex. 22 | 48.75 | aqueous PVA solution 2.5 | 0 | 48.75 | 85° C., 16 hours[1] | 140° C., 6 hours | 2.0 | 58 | 0.09 | —[2] |

[1] The gas phase was controlled at saturated vapor pressure by steaming.
[2] No dispersed-island structure was found.

What is claimed is:

1. A process for producing molded articles, which comprises autoclave-curing at not lower than 100° C. an aqueous composition comprising a hydraulic material (A) and a polyvinyl alcohol (B) powder, said polyvinyl alcohol (B) powder being contained in an amount of 0.1 to 20% by weight based on the weight of said hydraulic material (A).

2. A process for producing molded articles according to claim 1, wherein said aqueous composition further comprises a reinforcing fiber (C).

3. A process for producing molded articles according to claim 1, wherein said aqueous composition further comprises a substance (D) increasing the viscosity of aqueous solution of said polyvinyl alcohol (B) in an amount of at least 1% by weight based on the weight of said polyvinyl alcohol (B) powder.

4. A process for producing molded articles which comprises curing said aqueous composition of claim 1 at lower than 100° C. and then autoclave-curing the aqueous composition thus cured at not lower than 100° C.

5. A process for producing molded articles which comprises curing said aqueous composition of claim 3 at lower than 100° C. and then autoclave-curing the aqueous composition thus cured at not lower than 100° C.

6. A process for producing molded articles according to claim 1, wherein said hydraulic material (A) is cement.

7. A process for producing molded articles according to claim 4, or claim 5, wherein said substance (D) increasing the viscosity of aqueous solution of said polyvinyl alcohol (B) is a cross-linking agent of said polyvinyl alcohol (B) to form with said polyvinyl alcohol (B) a water-insoluble crosslinked matter at lower than 100° C., said water-insoluble crosslinked matter dissolving in water by autoclave-curing at not lower than 100° C., and increases the viscosity of the aqueous solution of said polyvinyl alcohol (B) resulting from this autoclave-curing.

8. A process for producing molded articles according to claim 7, wherein said substance (D) increasing the viscosity of aqueous solution of said polyvinyl alcohol (B) is a boric acid or derivatives thereof.

* * * * *